United States Patent [19]
Kageyama

[11] Patent Number: 5,200,824
[45] Date of Patent: Apr. 6, 1993

[54] LUMINANCE SIGNAL NOISE SUPPRESSOR

[75] Inventor: Atsuhisa Kageyama, Ibaraki, Japan

[73] Assignee: Matsushita Electric Industrial Co., Ltd., Osaka, Japan

[21] Appl. No.: 731,152

[22] Filed: Jul. 15, 1991

[30] Foreign Application Priority Data

Jul. 20, 1990 [JP] Japan ................................ 2-190757

[51] Int. Cl.⁵ ........................ H04N 5/21; H04N 5/208
[52] U.S. Cl. ..................................... 358/167; 358/162
[58] Field of Search ........................... 358/167, 36, 162

[56] References Cited
U.S. PATENT DOCUMENTS 4,768,094  8/1988  Ichinoi ................................ 358/167

FOREIGN PATENT DOCUMENTS 0212674  3/1987  European Pat. Off. .
0331017  9/1989  European Pat. Off. .

Primary Examiner—James J. Groody
Assistant Examiner—Mark R. Powell
Attorney, Agent, or Firm—Stevens, Davis, Miller & Mosher

[57] ABSTRACT

A luminance signal noise suppressor for suppressing noise of a video luminance signal automatically in a television receiver or the like in response to possible large noise which is detected as a high voltage by detecting high frequency components of an input video luminance signal band, and a noise suppression circuit is enabled or the correction quantity of a contour correction circuit is decreased.

5 Claims, 4 Drawing Sheets

LUMINANCE SIGNAL NOISE SUPPRESSOR

BACKGROUND OF THE INVENTION

The present invention relates to a luminance signal noise suppressor for a television receiver, a video tape recorder, a television tuner and the like, and relates to suppressors able to automatically suppress noise in video signals input with much noise in weak electric field receiving regions or zones.

In recent years, as color television receivers have become larger a problem has arisen of noise included in a video signal such that the noise is also more conspicuously viewable on their large size displays. Thus a luminance signal noise suppressor which suppresses noise in a video luminance signal for the purpose of displaying a picture image more clearly has been regarded as important particularly in a weak electric field zone. On the other hand, there are many strong electric field zones depending on the broadcasting channel, and it is required for conventional receivers to put turn such a noise suppressor ON/OFF every time the receiving channel is selected, which gives rise to a problem of complexity in operation.

An example of such conventional luminance signal noise suppressors will be described hereafter with reference to the drawings.

FIG. 4 shows a block diagram of a conventional luminance signal noise suppressor. In FIG. 4, a noise suppression circuit 21 reduces noise of an input luminance signal a and outputs an output luminance signal f. A switch 22 is operated to enable or disable the noise suppression circuit 21. The operation of a luminance signal noise suppressor constructed as described above will now be described.

First, the input luminance signal a is input to the noise suppression circuit 21, which suppresses or eliminates noise in accordance with a state of the switch 22, or the inputted signal is otherwise output as the output luminance signal f.

In the above-described construction, however, it is required to turn the switch 22 ON for a signal including much noise in case of a weak electric field signal, and to turn the switch 22 OFF every time for a signal including comparatively less noise in case of a strong electric field signal since detail information of a video signal are generally missing in a state that the noise suppression circuit 21 is ON. These operations are disadvantageously complicated.

SUMMARY OF THE INVENTION

It is an object of the present invention to provide a luminance signal noise suppressor in which the above-described conventional drawback has been solved, and which is able to switch a noise suppression circuit ON automatically when receiving a signal including much noise input with a weak electric field signal by detecting the signal and is able to switch the noise suppression circuit OFF automatically in the case of a signal including comparatively less noise in a strong electric field.

Further, not only the noise suppression circuit, but also a contour correction circuit which corrects a contour of a video luminance signal emphasizes noise. Thus it is a further object of the present invention to reduce the correction quantity of the contour correction circuit or reduce the correction quantity to zero automatically in the case of much noise in a weak electric field, thereby suppressing the noise emphasize, and to improve sharpness by increasing the correction quantity of the contour correction circuit in the case of sufficiently high frequency components of an input video signal in the case of a strong electric field.

According to one aspect of the present invention, a luminance signal noise suppressor comprises a high-pass filter circuit, a full-wave rectification circuit, a sample-hold circuit, a noise detection pulse generating circuit, a high frequency component quantity detection circuit, a noise suppression circuit, a contour correction circuit, a fine or detail portion correction circuit, a contour portion correction circuit, a contour portion—detail portion separating circuit, a delay circuit, a first adding circuit and a second adding circuit.

According to the present invention, high frequency components in an input video luminance signal band are extracted by the high-pass filter circuit and applied to full-wave rectification in the full-wave rectification circuit so as to detect the video high frequency components. By detecting a mean value during a vertical synchronizing period of the detected signals by the sample-hold circuit and holding the detected mean value voltage during an effective video signal period, it is shown that there is much noise when the amplitude of the voltage is large. In this case, it is possible to suppress noise of a video signal automatically by putting the noise suppression circuit ON, reducing the correction quantity of the contour correction circuit in accordance with the voltage, or reducing the correction quantity of the detail part correction circuit in accordance with the voltage. Further, when the quantity of high frequency components of a video signal other than the vertical synchronizing period is detected by means of the high frequency component quantity detection circuit and there is no noise during the vertical synchronizing period, the correction quantity of the contour correction circuit or the detail portion correction circuit is increased, thereby making it possible to increase the sharpness of the video signal.

DESCRIPTION OF THE PREFERRED EMBODIMENTS

Figure 1:
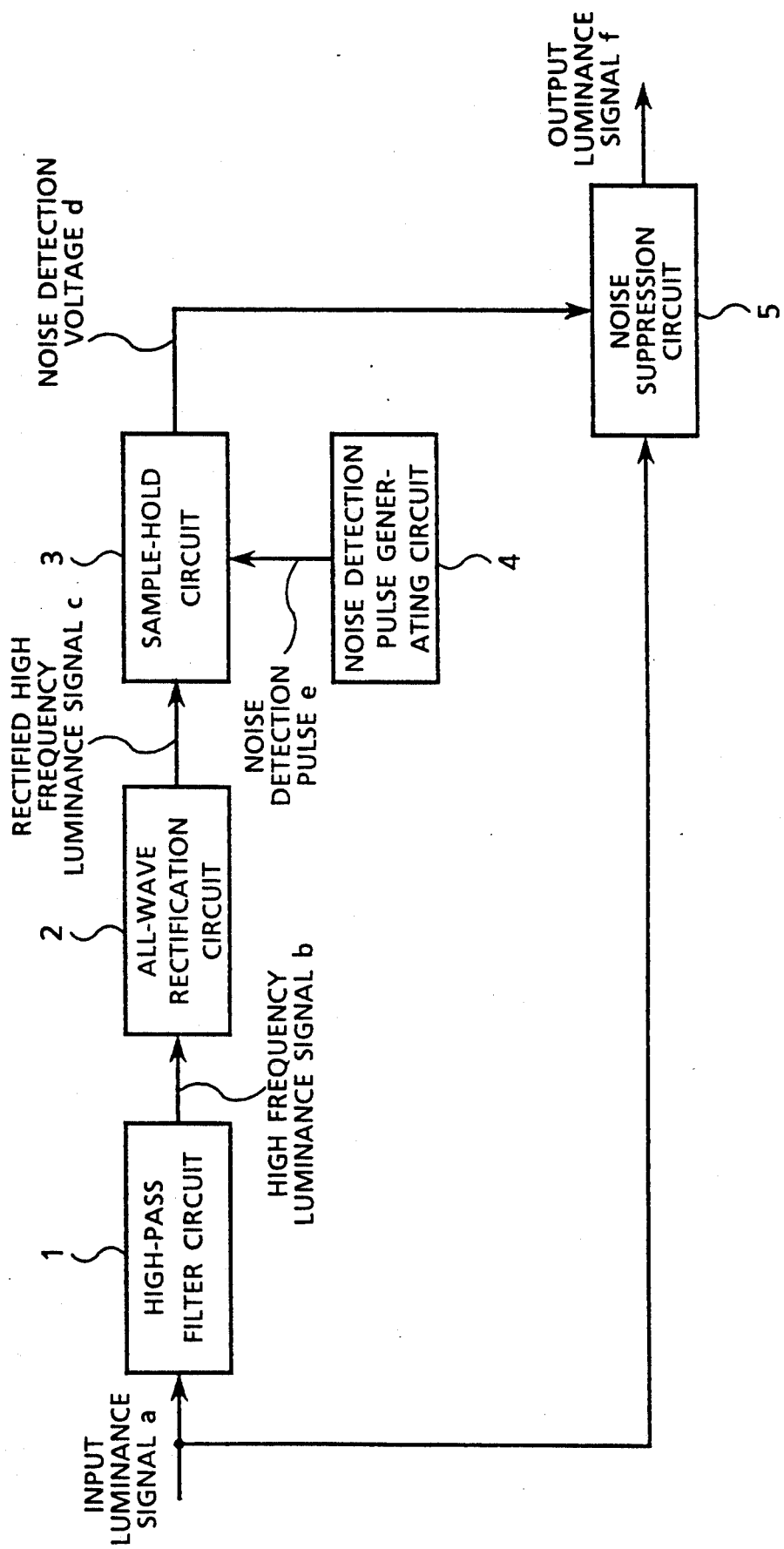
FIG. 1 is a block diagram showing a first embodiment of a luminance signal noise suppressor according to the present invention.

FIG. 1 is a block diagram showing a first embodiment of a luminance signal noise suppressor according to the present invention. In FIG. 1, a high-pass filter circuit 1 extracts high frequency components including noise and detail information signals of an input luminance signal a, and outputs them as a high frequency luminance signal b. A full-wave rectification circuit 2 applies full-wave rectification to the high frequency luminance signal b and outputs a rectified high frequency luminance signal c. A sample hold circuit 3 receives an input of noise detection pulse e, smoothes a rectified high frequency luminance signal c, holds the smoothed voltage until receiving the input of a next noise detection pulse e and outputs it as a noise detection voltage d. A noise detection pulse generating circuit 4 shapes a waveform of a vertical synchronizing signal m so as to exclude or eliminate portions of the video signal, character multiplexed signal and the like from the signal m, and outputs it as the detection pulse e. A numeral 5 denotes a noise suppression circuit.

The operation of a luminance signal noise suppressor constructed as described above will be described hereafter with reference to FIG. 1. First, the input luminance signal a is input to the high-pass filter circuit 1 and outputted as a high frequency luminance signal b with the high frequency components separated, which is input to the full-wave rectification circuit 2. The high frequency luminance signal b is applied with full-wave rectification by means of the full-wave rectification circuit 2, thus obtaining the rectified output signal c. Then, the rectified signal c is input to the sample-hold circuit 3, the rectified signal c is smoothed in the period of the noise detection pulse e which is input from the noise detection pulse generating circuit 4, and the smoothed voltage is held at the same time as the pulse disappears, which is output as a noise detection voltage d. The noise detection voltage d is input to a noise suppression circuit 5 which is similar to that in the conventional example, and controls the noise suppression quantity for the input luminance signal a which is input to the noise suppression circuit 5. In other words, an automatic control can be made so that the noise suppression quantity is increased when the noise detection voltage d is high (much noise), and the suppression quantity is reduced or made to zero automatically in a case contrary to the above. As a result, a noise suppressed output luminance signal f is obtained. In the above, the noise detection pulse is produced during a vertical synchronizing period free from influences of an effective video signal, thereby enabling an accurate noise quantity detection.

As described above, according to the present embodiment, it is possible to put a noise suppression circuit ON automatically in case a video signal including much noise is inputted in a weak electric field and the like so as to control the suppression quantity automatically by detecting high frequency components of a video signal with a high-pass filter circuit and rectifying these high frequency components in a full-wave rectification circuit, then sample-holding in a sample-hold circuit by a noise detection pulse, and controlling suppression quantity of a noise suppression circuit with a noise detection voltage obtained as the result of the foregoing.

Now, a second embodiment of the present invention will be described with reference to the drawing.

Figure 2:
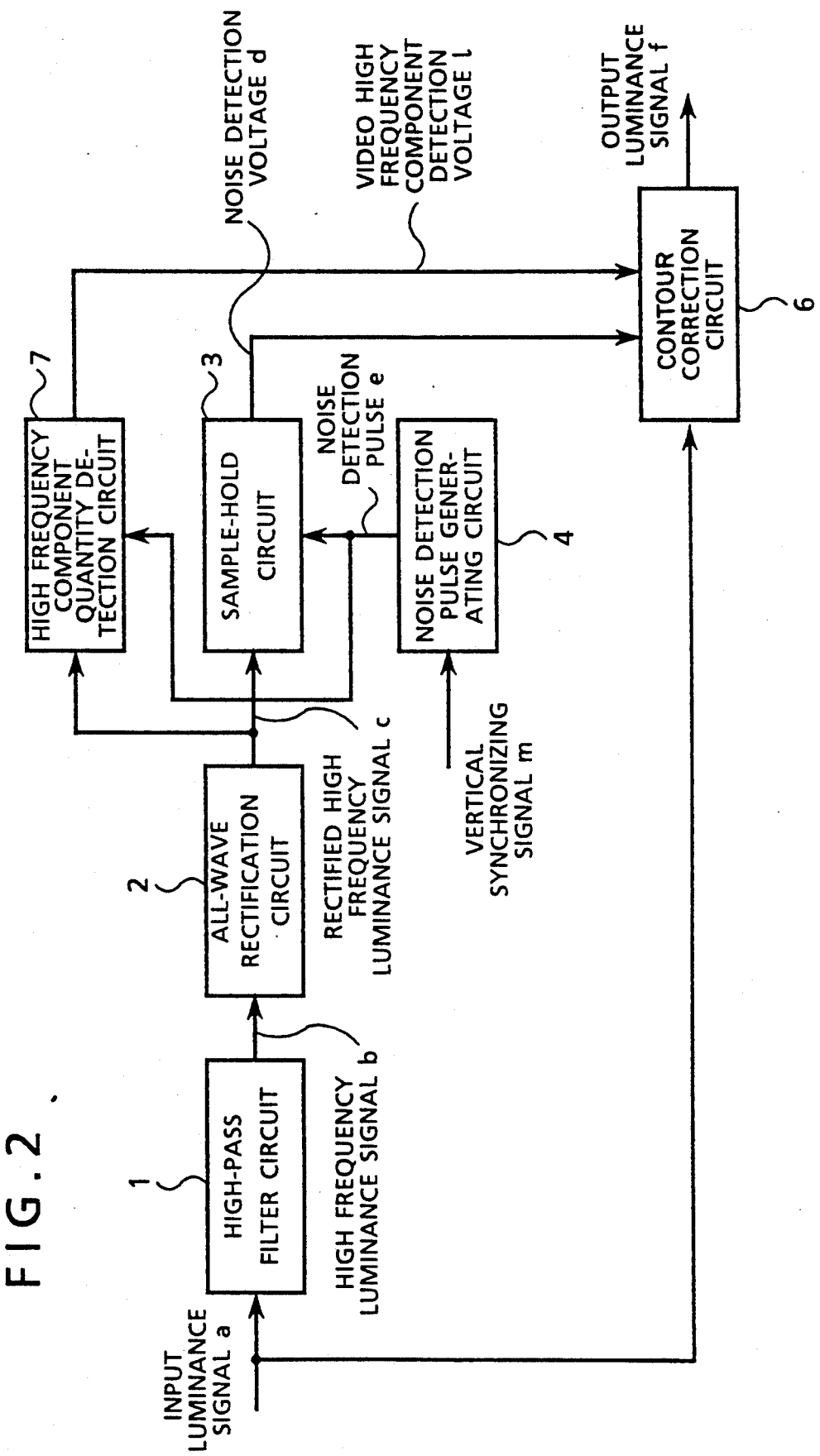
FIG. 2 is a block diagram showing a second embodiment of a luminance signal noise suppressor according to the present invention.

FIG. 2 is a block diagram of a luminance signal noise suppressor showing a second embodiment of the present invention.

In FIG. 2, a numeral 1 denotes a high-pass filter circuit, 2 denotes a full-wave rectification circuit, 3 denotes a sample-hold circuit, and 4 denotes a noise detection pulse generating circuit, and these units are the same as those in the first embodiment. A contour correction circuit 6 functions to correct the contour of an input luminance signal a so as to increase the sharpness. In such correction in general, processing is employed wherein secondary differential components of an input luminance signal are obtained by using a filter or a delay line and added to an original signal with gain control. Thus, there is such a drawback that the deeper the correction is applied, the more the noise is emphasized. A high frequency component quantity detection circuit 7 is composed of a smoothing circuit and a switch circuit, and averages voltages of a rectified high frequency luminance signal c during the period when the noise detection pulse is not being input and outputs the result as a video high frequency component detection voltage l.

The operation of the luminance signal noise suppressor constructed as described above will be described hereafter with reference to FIG. 2.

First, the process until the noise detection voltage d is obtained is similar to that of the first embodiment. In the present embodiment, the noise is prevented from being emphasized by inputting the noise detection voltage d to the contour correction circuit 6, and suppressing the correction quantity of the contour correction circuit automatically in the same manner as the first embodiment in case of much noise. Further, in the present embodiment, a high frequency component quantity detection circuit 7 is provided, and the rectified high frequency luminance signal c is smoothed during a period when the noise detection pulse e is not being input, in a word during, a period of an effective video signal, thereby to detect the quantity of high frequency components included in the video luminance signal. In a case where the quantity of high frequency components during the effective video signal period is large and the noise detection voltage d is low (low noise), the correction quantity of the contour correction circuit is increased on the contrary and contours of detail portions and contour portions of the video signal are emphasized without increasing the noise so much, thus making it possible to increase the sharpness.

As described above, it is possible to suppress the correction quantity of the contour correction circuit and suppress the noise automatically when the noise is high, and the correction quantity is increased automatically when there is no noise and high frequency components of the video signal are high, thereby making it possible to improve the sharpness by applying the noise detection voltage to the contour correction circuit, providing a high frequency component quantity detection circuit, detecting the quantity of the high frequency video signal components during the effective video signal period, and controlling the correction quantity of the contour correction circuit in accordance with the detection result.

Next, a third embodiment of the present invention will be described with reference to the drawing.

Figure 3:
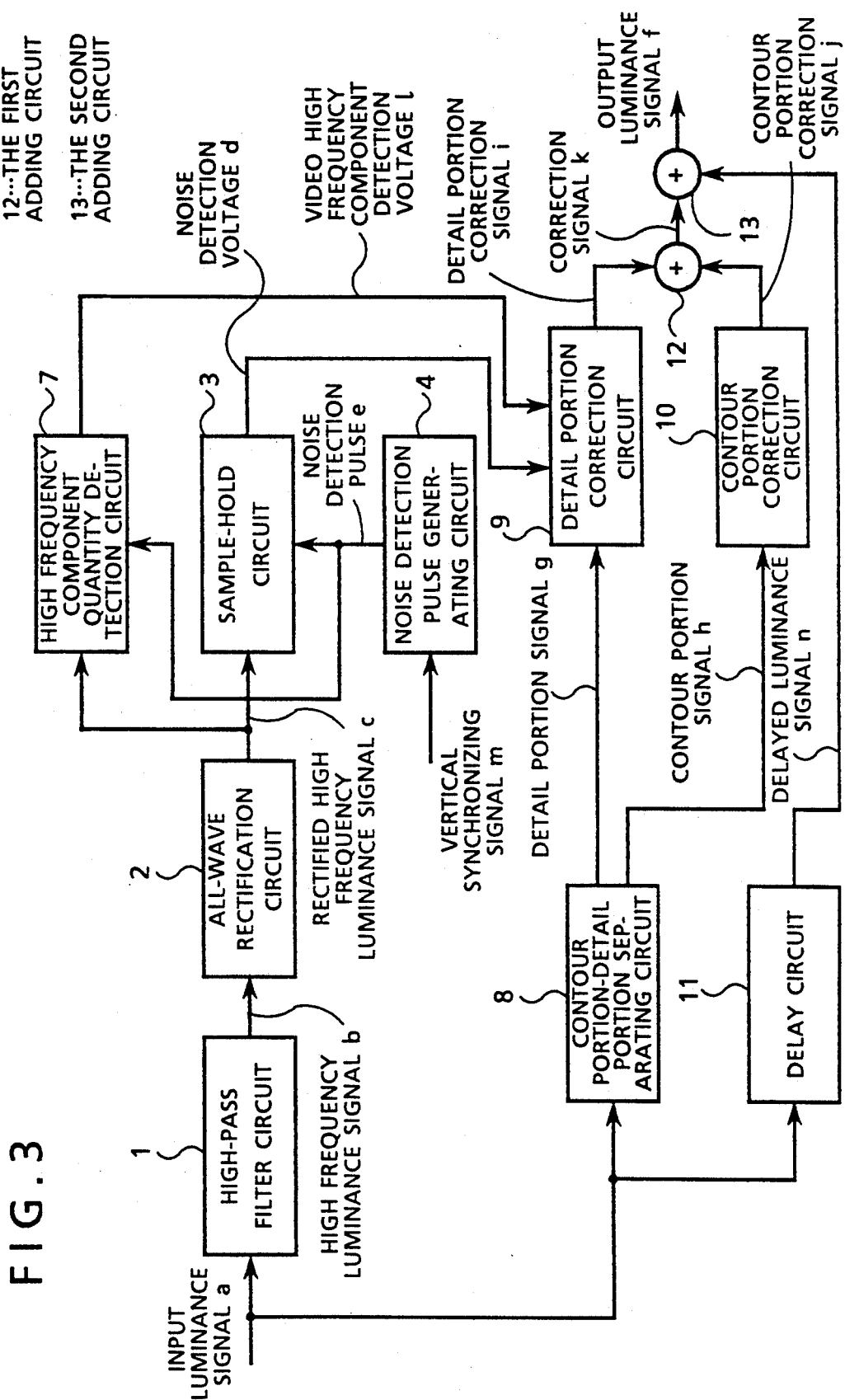
FIG. 3 is a block diagram showing a third embodiment of a luminance signal noise suppressor according to the present invention.
Figure 4:
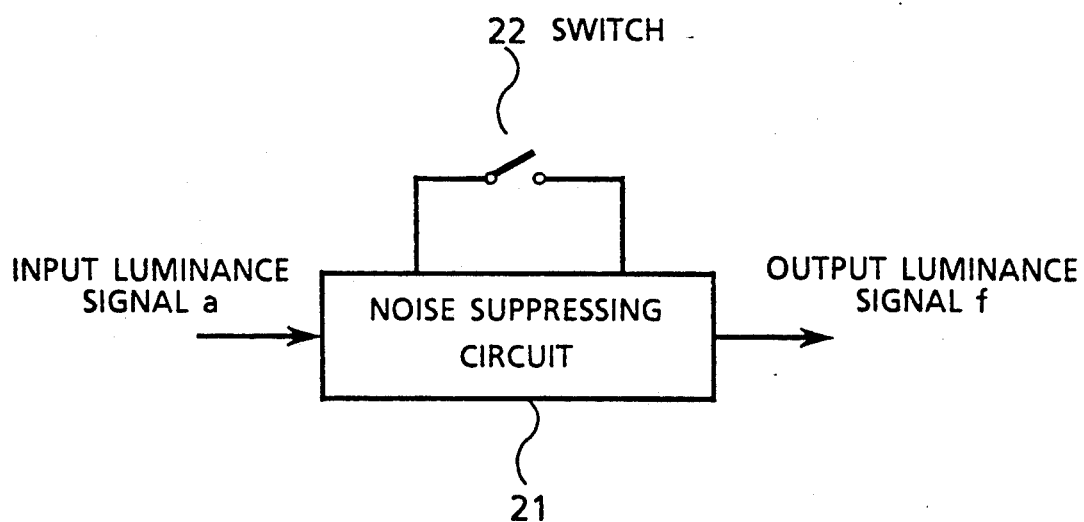
FIG. 4 is a block diagram of a conventional luminance signal noise suppressor.

FIG. 3 is a block diagram of a luminance signal noise suppressor showing a third embodiment of the present invention.

In FIG. 3, a numeral 1 denotes a high-pass filter circuit, 2 denotes a full-wave rectification circuit, 3 denotes a sample-hold circuit, and 4 denotes a noise detection pulse generating circuit, and these units are similar to those in the first embodiment. A high frequency component quantity detection circuit 7 is similar to that in the second embodiment. The difference from the construction of the second embodiment exists in that circuits for correcting a contour portion (edge having a comparatively large amplitude of a video signal) and a detail portion (comparatively detail amplitude component of a video signal) are provided separately in place of the contour correction circuit 6. A contour portion - detail portion separating circuit 8 applies primary differentiation to a video luminance signal a, divides the variation portion of the video luminance signal a into a detail portion and a contour portion in accordance with the amplitude thereof, and outputs a detail portion signal b and a contour portion signal g based on the result. A detail portion correction circuit 9 applies primary differentiation to the detail portion signal g, and outputs a detail portion correction signal i after applying gain control to the amplitude thereof by a noise detection voltage d and a video high frequency component detection voltage l. A contour portion correction circuit 10 applies primary differentiation to a contour portion signal h, and outputs the result as a contour portion correction signal j. A delay circuit 11 delays the input luminance signal a by the time delay portion due to correction of the contour portion and the detail portion, and outputs a delayed luminance signal n. A first adding circuit 12 adds the detail portion correction signal i to the contour portion correction signal j, and outputs a correction signal k. A second adding circuit 13 adds the correction signal k to the delayed luminance signal n, and outputs an output luminance signal f.

The operation of the luminance signal noise suppressor constructed as described above will be described hereafter.

First, the noise detection voltage d is produced in a same manner as the first embodiment. Further, a video high frequency component detection voltage l is produced in a same manner as the second embodiment. The present embodiment is characterized in that the detail portion containing a noise and the like and the contour portion containing none of them are corrected by means of separate correction circuits, respectively, in accordance with the amplitudes of variation portions of the video signal in place of the contour correction circuit 6. Among them, by controlling the detail portion correction circuit 9 which corrects the detail portion containing a noise and the like with those detected voltages similarly to the second embodiment, the correction quantity of the detail portion correction circuit 9 is reduced automatically in case much noise is contained, and the correction quantity is increased in case no noise and much high frequency components of the video signal are contained, thus making it possible to increase the sharpness.

It should be noted that although the circuit 2 has been described as a full-wave rectification circuit in the above-described embodiments, similar operation may be performed with half-wave rectification circuits.

EFFECTS OF THE INVENTION

According to the present invention, there are provided a high-pass filter circuit, a full-wave rectification circuit, a sample-hold circuit, a noise detection pulse generating circuit, a high frequency component quantity detection circuit, a noise suppression circuit, a contour correction circuit, a detail portion correction circuit, a contour portion correction circuit, a contour portion—detail portion separating circuit, a delay circuit, a first adding circuit and a second adding circuit, thus making it possible to automatically suppress the noise in case a weak electric field signal is input and also to increase the sharpness of a video luminance signal automatically in a signal containing less noise and much high frequency components in the second and the third embodiments, which is very effective in practical applications.

What is claimed is:

1. A luminance signal noise suppressor, comprising:

a high-pass filter circuit for extracting high frequency components from a luminance signal of an input video signal;

a rectification circuit for rectifying the extracted high frequency components;

a sample-hold circuit for sampling to produce a mean voltage of the rectified components during a period of a vertical synchronizing signal of the input video signal and holding the sampled mean voltage during a period until a next vertical synchronizing signal;

a noise detection pulse generating circuit for detecting a noise level in said vertical synchronizing signal of the input video signal, and in accordance with said noise level, enabling said sample-hold circuit; and a circuit means for receiving the luminance signal and suppressing noise therein in accordance with a correction quantity that varies in accordance with an output voltage of said sample-hold circuit;

whereby a noise level of said luminance signal is automatically reduce in a weak electric field.

2. A luminance signal noise suppressor, comprising:

a high-pass filter circuit which extracts high frequency components of a luminance signal of an input video signal;

a rectification circuit which applies rectification to said high frequency components;

a sample-hold circuit which samples a mean value of the rectified signals during a period of a vertical synchronizing signal of said input video signal and holds sampled voltages during a period until a next vertical synchronizing signal;

a noise detection pulse generating circuit for detecting a noise level in said vertical synchronizing signal of the input video signal, and in accordance with said noise level, driving said sample-hold circuit; and a correction circuit having a correction quantity that varies in accordance with an output of said sample-hold circuit, said correction circuit for contour correcting at least a portion of said luminance signal in accordance with said correction quantity;

whereby when the luminance signal contains a high noise level in a weak electric field, said noise level is reduced by reducing said correction quantity automatically.

3. A luminance signal noise suppressor, comprising:

a high-pass filter circuit which extracts high frequency components from a luminance signal of an input video signal;

a rectification circuit which applies rectification to said high frequency components;

a sample-hold circuit which samples a mean value of rectified signals during a period of vertical synchronizing signal of the input video signal and holds sampled voltages during a period until a next vertical synchronizing signal;

a nose detection pulse generating circuit for detecting a noise level in said vertical synchronizing signal of the input video signal, and in accordance with said noise level, driving said sample-hold circuit; and a video high frequency component quantity detection circuit which detects a mean value of said rectified signals other than during a period of said vertical synchronizing signal and provides an output representing said mean value; and a correction circuit having a contour correction quantity that is decreased when either the output of said sample-hold circuit is high or the output of said video high frequency component quantity detection circuit is low and that is increased when either the output of said sample-hold circuit is low or the output of said video high frequency component quantity detection circuit is high, said correction circuit for contour correcting at least a portion of said luminance signal in accordance with said correction quantity;

whereby when said luminance signal contains a high noise level in a weak electric field, said noise level is reduced by reducing said correction quantity automatically and sharpness of said input video signal is increased by increasing said correction quantity automatically when said luminance signal contains a high level of video high frequency components in a strong electric field.

4. A luminance signal noise suppressor, comprising:

a detail portion correction circuit which selectively corrects contours of detail amplitude components of a luminance signal of an input video signal;

a contour portion correction circuit which selectively corrects contours of amplitude components of said luminance signal having a large variation;

a high-pass filter circuit which extracts high frequency components from said luminance signal of said input video signal;

a rectification circuit which applies rectification to said high frequency components;

a sample-hold circuit which samples a mean value of rectified signals during a period of a vertical synchronizing signal of said input video signal and holds sampled voltages during a period until a next vertical synchronizing signal;

a noise detection pulse generating circuit for detecting a nose level in said vertical synchronizing signal of the input video signal, and in accordance with said noise level, driving said sample-hold circuit;

said detail portion correction circuit having a contour correction quantity that is controlled in accordance with the output of said sample-hold circuit, and said contour correction quantity of detail amplitude components containing a high noise level is reduced automatically when said luminance signal contains a high noise level in a weak electric field, thereby to reduce said noise level.

5. A luminance signal noise suppressor, comprising:

a detail portion correction circuit which selectively corrects contours of detail amplitude components of a luminance signal of an input video signal;

a contour portion correction circuit which selectively corrects contours of amplitude components of said luminance signal having a large variation;

a high-pass filter circuit which extracts high frequency components from said luminance signal;

a rectification circuit which applies rectification to said high frequency components;

a sample-hold circuit which samples a mean value of rectified signals during a period of a vertical synchronizing signal of said input video signal and holds sampled voltages during a period until a next vertical synchronizing signal;

a noise detection pulse generating circuit for detecting a noise level in said vertical synchronizing signal of the input video signal, and in accordance with said noise level, driving said sample-hold circuit; and a video high frequency component quantity detection circuit which detects a mean value of said rectified signals other than during a period of said vertical synchronizing signal and provides an output representing said mean value;

said detail portion correction circuit having a contour correction quantity that is decreased when either the output of said sample-hold circuit is high or the output of said video high frequency component quantity detection circuit is low and is increased when either the output of said sample-hold circuit is low or the output of said video high frequency component quantity detection circuit is high;

whereby when said luminance signal contains a high noise level in a weak electric field, said noise level is reduced by reducing said correction quantity automatically and sharpness of the input video signal is increased by increasing the correction quantity automatically when said luminance signal contains a high level of video high frequency components in a strong electric field.

* * * * *